Nov. 15, 1955 R. V. JUDY 2,724,020

REGISTER SENDER

Filed Jan. 5, 1952 2 Sheets-Sheet 1

INVENTOR:
ROBERT V. JUDY
BY John J. Bellamy
ATTORNEY

INVENTOR:
ROBERT V. JUDY
BY John J. Bellamy
ATTORNEY 2,724,020

REGISTER SENDER

Robert V. Judy, Chicago, Ill., assignor, by mesne assignments, to International Telephone and Telegraph Corporation, a corporation of Maryland Application January 5, 1952, Serial No. 265,173

12 Claims. (Cl. 179—18)

This invention relates to a register sender, such as is used by a telephone operator to register successive digit-key operations and to transmit corresponding digit series of impulses.

One object of the invention is to provide a satisfactory and reliable register sender of the foregoing character which is economical in its use of relay apparatus.

A further object is to provide a register sender of the foregoing character which may be used satisfactorily to transmit numbers containing any number of digits which may be encountered in practice.

A still further object is to provide simple and reliable sending apparatus for effecting the transmission and spacing of counted digit series of impulses.

*General description*

It has been chosen to illustrate the invention as applied to a register sender employing a series of registers each including a group of four relays operable in combination to register any one of ten digit values by marking the corresponding digit wire of a multiple between the registers and the sending apparatus. Each register further includes transfer-relay apparatus for transferring the control of the key set from one register to another, and further transfer-relay apparatus for placing the sending apparatus under the control of the registers successively.

The sending apparatus includes a device for generating outgoing and local pulses concidentally, and a device for counting the local pulses incidental to controlling the number of outgoing impulses in a series, as well as apparatus for timing the intervals between successive series.

One feature of the invention relates to the use of a key-pilot relay common to all the registers and so interrelated therewith that a single relay in each register serves to effect the transfer of the keyset wires from that register to the next.

Another feature relates to the arrangement for clearing out the registers after they have been used, and for permitting their reuse in sending numbers containing more digits than there are registers.

A further feature relates to the provision of a simple register-pilot arrangement for insuring that the sending apparatus will function only when the register apparatus contains an unsent digit registration.

A still further feature relates to the use of a simple condenser-timed relay arrangement for controlling the interdigit intervals.

Other objects and features will appear as the description progresses.

*The drawings*

Referring to the drawings, comprising Figs. 1 to 4:

Figures 1, 3, 4:
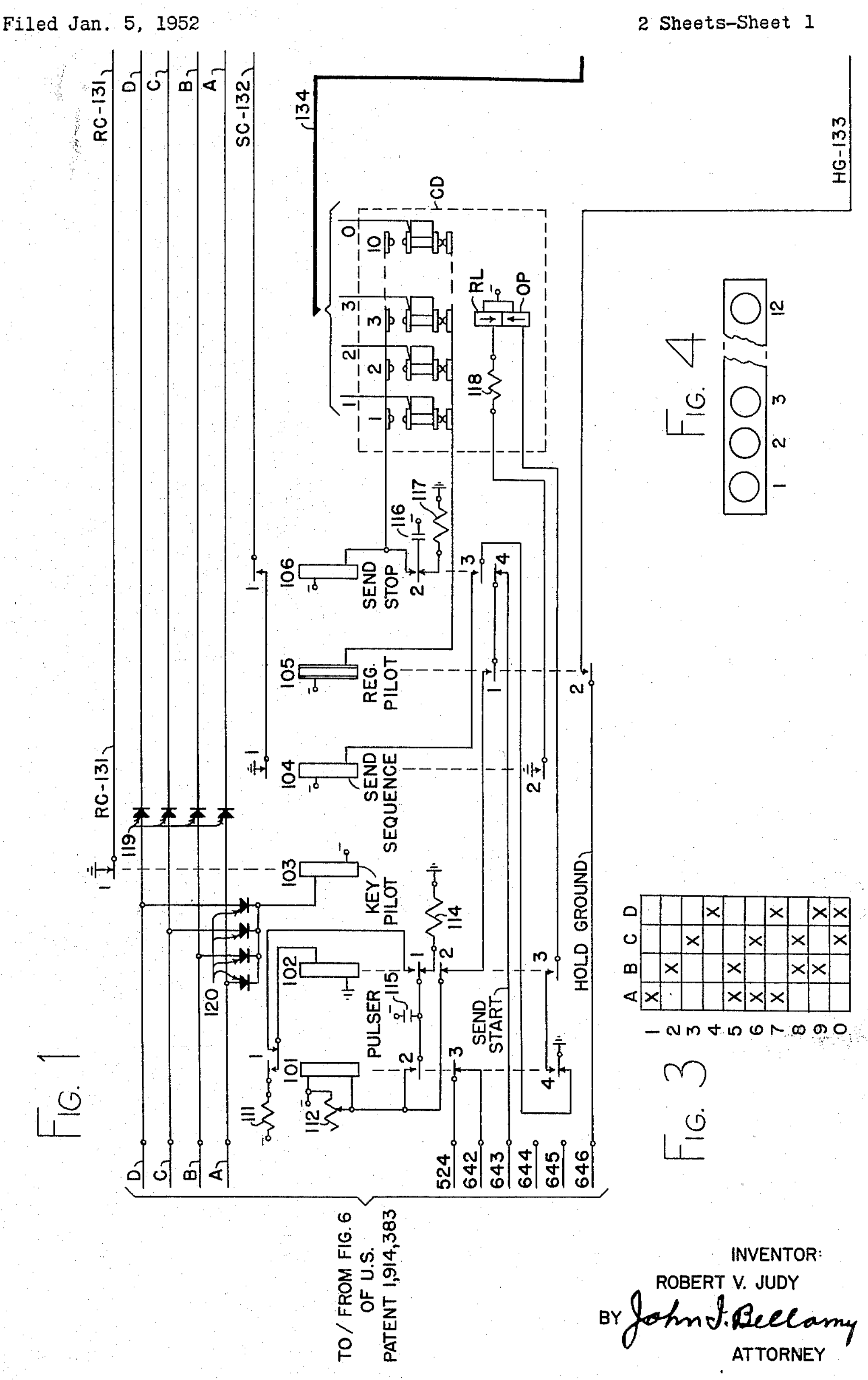
Fig. 1 shows the sending apparatus and a portion of the registering-control relay apparatus.
Fig. 3 shows the code according to which the digits are registered.
Fig. 4 shows a lamp strip in which each lamp corresponds to a register of the sender and provides a signal indication when a digit is stored in the respective register with which it is associated.
Figure 2:
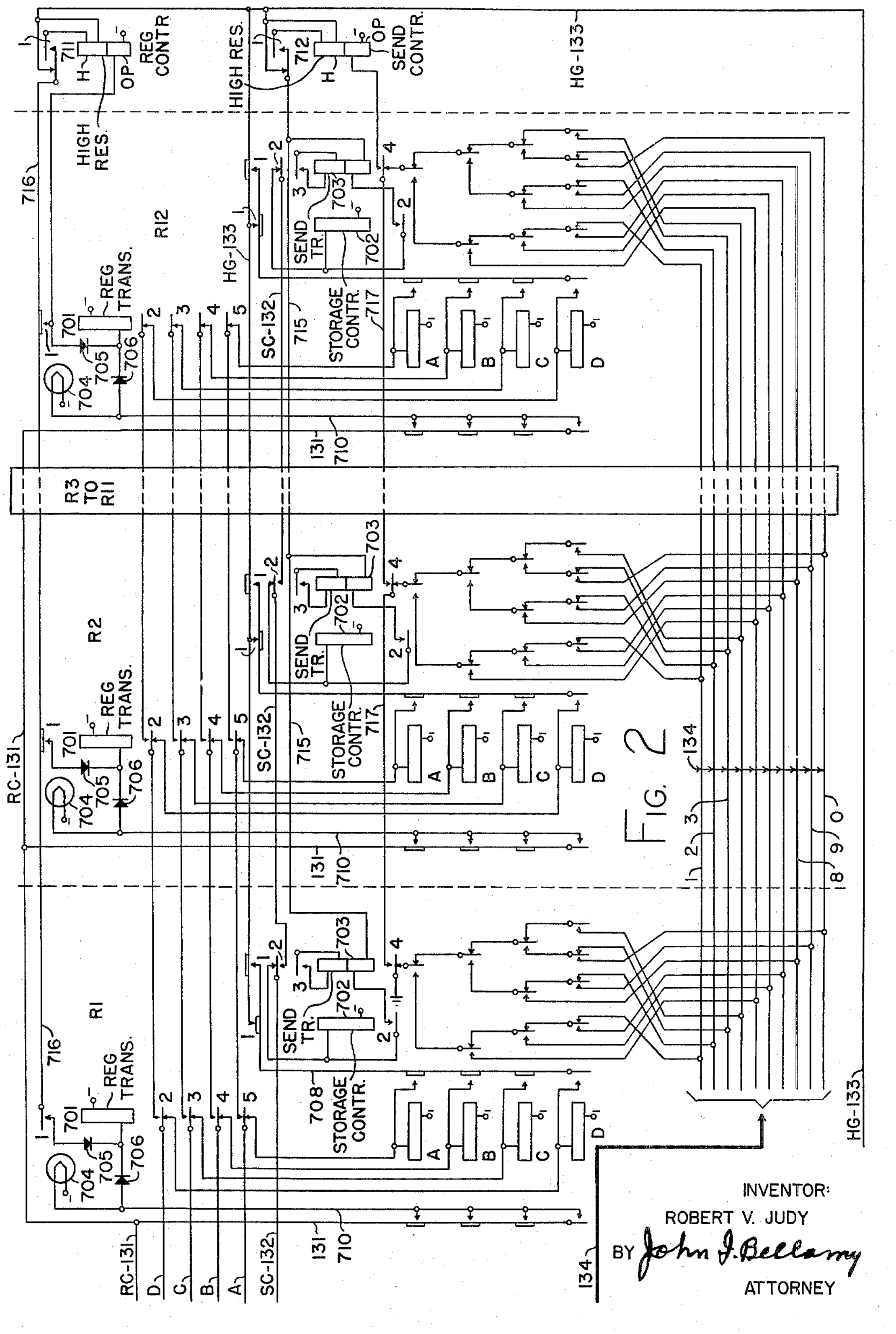
Fig. 2 shows the digit registers together with the relays for controlling the clearing out of the transfer relays of the digit registers.

To facilitate description of the invention herein disclosed, the embodiment of the invention shown in Figs. 1 and 2 is arranged for operative association with the system disclosed in U. S. Patent 1,914,383, issued to Edward S. Peterson on June 20, 1933. The conductors D, C, B, and A, 524, and 642 to 647 extending in at the left-hand edge of Fig. 1 of the drawings correspond to the conductors similarly identified at the right-hand edge of Fig. 6 of the patent. Before considering registration of digits in the registers, it is assumed that connections are made for seizing a line path over which pulses are to be sent and that connections are made over which hold-ground potential is applied to conductor 646. Ground potential may thereupon be made available on send-start conductor 643 for sending of registered digits by depressing the send-start button ST at the operator's key set.

In general, the sending apparatus of Fig. 1 includes a pulser which, in the illustrated embodiment of this invention comprises a pair of cyclically operated relays 101 and 102 controlled in operation by ground potential supplied over a send-start path extending from the conductor 643. The pulser intermittently connects conductors 524 and 642 at contacts 1 of relay 101 to generate pulses on the telephone line with which the sender is associated, while local pulses controlling the counting device CD are generated by periodic closure and release of contacts 4 and 3 of relays 101 and 102 respectively.

The counting device CD in the described embodiment is of the type having a series of armatures, ten in number, arranged for succesive operation by a double wound coil. One winding OP of the coil is an operate winding arranged to actuate one armature with each pulse of current supplied thereto, while the second winding RL is arranged to release or knock down all operated armatures when a pulse of current is supplied to it. Since each armature is maintained operated until knocked down by a pulse of current applied to the knock-down winding, application of a series of pulses to the operate winding of the counting device causes the number of operated armatures to progressively accumulate until the pulsing on the operate winding ceases. All operated or actuated armatures are then restored simultaneously by application of ground potential to the winding of knock-down winding RL.

Each armature of the counting device is arranged to actuate a set of make contacts and a set of break contacts. The stationary contacts of the break-contact sets are all joined together by a conductor connected to the register-pilot relay 105, while the stationary contacts of the make-contact sets are joined and connected to the winding of a send-stop relay 106. Ten conductors 134, each of which is assigned to represent or designate one of a set of digits from one to ten, are connected to the counting device so that each is joined to the traveling blades of the contact sets corresponding to the number of the armature in the series with which it is associated. The digit conductors 134 extend from the counting device and are multipled with the digit-storage contacts of the registers.

A send-sequence relay 104, at its contacts 1, controls the sequence of registers from which digits are sent and cleared, while the send-stop relay 106, timed by a condenser 116, provides an interdigit pause or space in the generation of digit pulses following the sending of each digit.

A key-pilot relay 103, cooperating with two groups of blocking rectifiers 119 and 120, are arranged to assure reliable digit registration and control of the sequence of registration in the digit registers of Fig. 2.

The register-pilot relay 105 controls the application of hold-ground potential extending from conductor 646 to the hold-ground conductor 133 which in turn effectively controls the registration and storage of digits in the registers as well as the clearing of digits from the registers.

Fig. 2 illustrates a series of twelve digit registers all of which are similar in circuit arrangement. Since all are similar, simplification of the drawing has been effected by illustrating the third through the eleventh registers in the form of a single block (R3–R11). Following the last digit register R12, register-control and send-control relays 711 and 712 respectively, are shown as they are connected to the register-hold and send-hold circuits of the digit registers as well as to the hold-ground conductor 133.

*Storing a number*

To store a digit of a number in one of the digit registers, as register R1 of Fig. 2, the operator depresses the appropriate digit button of the key at her position, whereupon ground potential is applied at the key to a predetermined combination of setting conductors A, B, C, and D to operate a corresponding combination of register relays A, B, C, and D in the register R1 according to the combination code set out out in Fig. 3.

The closure of contacts 1 of the operated register relays extends the register-control conductor RC–131 to the register-transfer relay 701 of the first register over conductor 710 and through the blocking rectifier 706. Relay 701, however, is unaffected by such extension until the operator releases the depressed digit button, as explained hereinafter.

For the short period when the digit button of the operator's key is held in depressed condition to effect a digit registration, ground potential applied to the predetermined combination of one or two of the setting conductors of conductor group A, B, C, and D passes through the blocking rectifiers 120 associated with such conductors to operate the key-pilot relay 103. Operation of relay 103 disconnects ground from the register-control conductor RC–131 at its break contacts 1, thereby holding the operate path for the register-transfer relay 701 open during the period when the register relays are being operated and locked in.

Each armature of the counting device is arranged to actuate a set of make contacts and a set of break contacts. When the selected digit button is released by the operator, the operate ground extending from the key set to the winding of relay 103 is disconnected, thereby releasing the relay, and reapplying ground to the register-control conductor RC–131. With the reapplication, of ground on the conductor RC–131, the register-transfer relay 701 is operated which, at its transfer contacts 2, 3, 4, and 5, thereupon disconnects the conductors A, B, C, and D from the register relays A, B, C, and D in register R1 and connects them to the corresponding register relays A, B, C, and D in register R2. Register R2 is thereby conditioned to receive the next digit of the number.

Actual storage of a digit, as in register R1, is effected in the stackup of contacts on the register relays. Each of the four register relays has an associated stackup of contacts which is so interconnected with the stackups of the other three register relays that when the combination of register relays corresponding to a digit are operated, a connection to ground at the back contacts 4 of send-transfer relay 703 is extended over a path of the interconnected contacts to one of the conductors 134 corresponding to the stored digit.

Ground potential applied to any one of the conductors 134 is extended through the closed back contacts of the connected traveling blades of the counter to the winding of the register-pilot relay 105, which thereupon operates, closing its contacts 2 to provide a path for hold-ground potential from conductor 646 to conductor 133. Thus, hold-ground potential is in effect provided as soon as the register relays of the first register R1 operate to store a digit. Nothing occurs within the circuit to start sending the stored digit, however, unless the send-start signal is applied to conductor 643 to start the pulser relays 101 and 102 as hereinafter explained.

Ground potential for retaining register-transfer relay 701 operated following storage of a digit in register R1 is supplied from grounded conductor 646, Fig. 1 over a path to conductor 716 through the make contacts 2 of register-pilot relay 105, conductor 133, and break contacts 1 of unoperated relay 711, Figure 2.

It will be noted that although the setting conductors A, B, C, and D are transferred by operation of the transfer relay 701, the already operated combination of register relays A, B, C, and D of register R1 is not affected by the transfer operation since, once having been operated, the register relays remain locked in as long as the storage-control relay 702 remains in unoperated condition. The operation of relay 702, as subsequently explained, is not effected until the stored digit is cleared from the register. It will also be noted that the blocking rectifiers 119 connected in the path of conductors A, B, C, and D prevent ground potential on conductor 133 from being extended back to conductor 708 through the transfer contacts of relay 701 and the blocking rectifiers 120 to the winding of key-pilot relay 103, and consequently prevent the registration of additional digits in registers beyond the first.

A rectifier 705, provided in the lock-up circuit of the register-transfer relay 701, localizes hold-ground potential on conductor 716 to prevent it from extending back over conductor 710 to conductor RC–131 where it would cause faulty operation of relays in the register-transfer circuit.

Each of the lamps 704 is arranged to provide a visual indication when a digit is stored in its respective register, by connecting the lamp between conductor 710 and battery so that the lamp becomes energized by ground potential on conductor RC–131 whenever any one of the register relays with which it is associated is in operated condition. Energization of the register-transfer relay for transfer of the digit conductors to the next succeding register in the series is effected at the same time that the lamp is energized. Thus, each time that the operator is about to depress a digit button, an indication is provided as to whether a register is free to accept storage of a digit, and also, which register of the series is ready to accept the next digit to be stored. Accordingly, the speed with which successive numbers may be registered in the sender may be gauged to the rapidity with which numbers already register therein are cleared When the last register R12 receives a digit for storage, its register-transfer relay 701 operates as described. Its contacts 2 to 5 disconnect the associated register relays from the key set, and its contacts 1 lock the relay to wire 716, at the same time extending the ground potential on conductor 716 to the operate winding OP of register-control relay 711 to cause that relay to operate. Upon operating relay 711 inserts its high-resistance holding winding H in series with conductor 716 over which all relays 701 are locked. The resistance of winding H of this relay is large enough that insufficient current can pass therethrough to maintain any relay 701 operated, and this winding has sufficient turns that it holds relay 711 operated in series with any relay 701 and/or in series with winding H of relay 711. Except for its initial operating circuit, each relay 701 is now free to release immediately. If one or more of the stored digits have been transmitted as hereinafter described, the initial operating circuit of each concerned relay 701 has been opened, wherefore each such relay restores, and relay 701 of register R1 again connects the key set wires A to D to the respective relays A to D of this register. The remaining relays 701 remain operated over their respective operating circuits, and relay 711 remains operated by current flow through its two windings by way of contacts 1 of relay 701 of register R12.

As the remaining stored digits are sent out, the effectively unlocked relays 701 of the remaining registers sequentially restore, relay 711 restoring with relay 701 of R12.

If more digits are to be stored while the sending is in progress, the consequent ungrounding of wire RC–131 opens the initial operating circuit of all operated relays 701, permitting all of them and relay 711 to restore immediately. Locking ground is restored to wire 716 by relay 711.

In view of the described restoration of the register-transfer relays 701 following registration of digit information in the final register R12 and the transmission of at least one stored digit, the first registers R1 to R12 are made ready for the storage of respective additional digits during the sending operation. It is clear, however, that each of the registers so intended to register a second digit must be cleared of its first registration before the second registration can be effected. Thus, the rate at which the registered digits are cleared from the register, and consequently, the traffic conditions of the circuits with which the sender is associated are determining factors in calculating the minimum number of registers that are necessary in the sender. In some installations, where trunk paths are not readily available within a short period of time, a complete number must be stored within the registers before a sending operation begins, and in such instances, a register would be required for each digit of the number. In many installations, however, traffic conditions are such that a trunk is readily available to a sender before all digits of a number are stored, whereupon a sending operation begins before full registration of the number is completed. Consequently, the first registers in the series would be capable of registering a second digit of the number while the final registers in the sender are in the process of sending and being cleared out. Under these circumstances, one or more of the first registers in the series may be used over again for storage and sending of digits, thereby minimizing the number of registers required for a sender.

It has been chosen to show herein a sender capable of storing and transmitting a number including twelve digits without reusing any of the registers. As described, however, a number including more than twelve digits may be sent by reusing as many of the first registers in the series as necessary, so long as the initially registered number in each has had an opportunity to be cleared. As an example, in certain installations where traffic conditions permit, an average of nine digits may be sent by the time the twelfth digit is being registered. Under such conditions, the first and second, or even more registers may be safely utilized to register additional digits of the number. It will be understood that in making a determination of the average number of registers that will be cleared for reuse in a given time, that if in general, larger digits predominate in the numbers, more time will be required to clear out the registers than when smaller digits predominate in the members.

*Sending out the stored digits*

The ground potential applied to conductor 643 in response to the normal operation of the associated apparatus of the aforementioned patent, is extended over a path comprising contacts 4 of send-start relay 106, the closed contacts 1 of register-pilot relay 105, and the break contacts 2 of the pulser relay 102 to the winding of pulser relay 101. This starts the cyclic operation of the pulser relays under control of the counting device CD. The cycle sequence of pulser relays 101 and 102 is such that relays 101 and 102 operate in quick succession and then restore in slow succession, each with its individual timing period. With each operation and restoration of relay 101, its contacts 3 momentarily connect conductors 524 and 642 to generate one pulse of a series corresponding to digits being sent from the register.

In greater detail, when pulser relay 101 operates responsive to application of ground potential to its operating path, an operating path is closed for pulser relay 102 at contacts 1 of relay 101. Relay 102 thus operates by reason of extension of battery potential through the current-limiting resistance 111 and front contacts 1 of relay 101 to the grounded winding of relay 102. With both relays 101 and 102 operated, condenser 115, which is normally maintained in charged condition in its own charging circuit comprising the back contacts 1 of relay 102 and current limiting resistance 114, is connected in parallel with the winding of relay 101 through its own make contacts 3. Condenser 115 is thereby, in effect, placed across the winding of relay 101, whereupon it commences discharging through the winding to maintain it operated independent of its operate circuit. A variable resistance 112 connected across the winding of relay 101 determines the rate of discharge of the condenser, thereby controlling the time of operation of the relay 101 after its operate circuit is opened.

Upon release of relay 101, condenser 115 is placed in series with the winding of relay 102 by closure of the back contacts 1 of relay 101. A charging path is thereby provided for the condenser through the winding of relay 102, whereby the relay will be maintained operated as long as the charging current passing through the winding is above the release value thereof. The rate at which condenser 115 is charged determines the length of time that relay 102 will be maintained operated after relay 101 releases. A variable resistance 113 in parallel with the winding of relay 102 determines the rate of discharge of the condenser, and consequently the period of operation of relay 102. Upon release of relay 102, when condenser 115 approaches full charge, the condenser is disconnected from the winding of relay 102 at contacts 1 of that relay, while at contacts 2, the operate path for relay 101 is simultaneously closed, thereby restoring the pulser relays for another cycle of operation.

During each cycle of operation of the pulser relays, a local pulse is generated in the operate circuit of the counting device CD by application of ground at front contacts 4 of relay 101, followed by closure of the make contacts 3 of relay 102. Each such pulse causes the operate winding OP of the counting device to be energized momentarily to actuate one of the armatures of the device. Thus, when a series of local pulses are generated responsive to a cycle operation of the pulsing relays, a series of armatures of the counting device are successively operated and maintained operated cumulatively until the armature corresponding to the number to be pulsed by the sender is reached, whereupon ground potential extended from the concerned digit conductor 134 is transferred from the operate circuit of the register-pilot relays to the circuit of the send-stop relay 106 by way of the make contacts associated with the armature.

Upon operation of the send-stop relay 106, a charged condenser 116 is disconnected from its charging circuit in series with resistance 117 and effectively placed across the winding of relay 106 to provide its own timed hold circuit. The condenser 116 is of such size that it holds a sufficient charge to maintain the send-stop relay operated for a period distinguishably longer than the spacing between pulses, following removal of ground from the concerned digit conductor 134, so that digit-pulse groups are readily distinguishable in a series of pulses. Thus, after generation of each pulse group corresponding a digit, the send-stop relay 106, at its contacts 4, opens the operate circuit of the pulser relays, thereby providing an inter-digit pause during which ground is applied to the back contacts 4 of relay 101 to close the operate circuit for send-sequence relay 104 through the make contacts 3 of the send-stop relay 106.

When the send-stop relay 106 is operated, it applies ground to the send-control wire SC–132 at its contacts 1. The subsequent operation of the send-sequence relay, however, removes ground from conductor SC–132, thereby causing a pulse of ground potential to be sent over conductor SC–132 to the winding of storage-control relay 702 of the register from which sending control is to be removed by reason of its stored digit having already been sent.

With operation of the send-sequence relay 104, ground is applied at its make contacts 2 to the release winding RL of the counting device CD through a current limiting resistance 118. A polarity reversal in the magnetic circuit of the device is thereupon effected to knock-down, or release, all of the actuated armatures on the device. When send-stop relay 106 releases at the end of the inter-digit pause, the send-sequence relay 104 also drops out by reason of its operate circuit being opened. The circuit for the release winding RL of the counting device CD is thereupon opened, thereby conditioning the counting device CD for another counting operation. The pulse of ground sent over conductor SC–132 to the winding of storage-control relay 702 causes this relay to operate and, at its contacts 1 to open the extension of ground from conductor HG–133 to the windings of register relays A, B, C, and D, thus causing the operated register relays to release, and at their contacts 1 to deenergize indicating lamp 704.

Relay 702 at its contacts 2 closes a path to the operate winding of send-transfer relay 703. This permits the extension of the pulse of ground potential on conductor SC–132 through the back contacts 2 of relay 703 and the make contacts 2 of relay 702 to one terminal of the operate winding of relay 703. The other terminal of the winding, however, also has ground potential applied thereto from the conductor 646 through the make contact 2, register-pilot relay 105, hold ground conductor HG–133, the back contacts of relay 712, and conductor 715. Since ground potential is thus applied to both terminals of the operate winding of relay 703, it will not operate. At the end of the pulse of ground on conductor SC–132, however, the battery potential on one terminal of the winding of relay 702 is extended through the winding and its closed contacts 2 to the winding of relay 703, thereby causing relay 703 to operate and to be held operated in series with the winding of relay 702.

The operation of send-transfer relay 703, at its contacts 1, extends the ground on conductor HG–133 to the back contacts 2 of the register relays A, B, C, and D thereby preparing the register for a subsequent registration of a second digit. At its front contacts 2, relay 703 transfers ground potential on conductor SC–132 from the winding of storage-control relay 702 to the winding of the corresponding relay of the next register in the series. At contacts 3 of relay 703, a second winding on the relay is short circuited to make it a slow-release relay on subsequent deenergization of the operate winding. At contacts 4, ground potential is transferred from the interconnected stackup of contacts on the register relays to conductor 717 which extends ground potential to the interconnected stackup of contacts of the next succeeding set of register relays. The ground potential at contacts 4 of relay 703, thus is extended down through the stackup of contacts of the succeeding register relays to the digit conductor 134 corresponding to the next digit to be sent by the sender.

In view of the above described operations, it will be noted that the ground potential on conductor 646, passing through the contacts 2 of the register-pilot relay 105, controls the step-by-step registration and transfer of registers during operation of the sender, and if for any reason hold ground should be disconnected at contacts 2 of the register-pilot relay, all stored digits would be wiped out and sending would cease. Thus, if during registration of a number, a wrong digit is stored, the operator may clear all registers by merely depressing her error button ER. This removes the hold-ground potential at the key set and restores all operated register relays, thereby removing ground potential from conductors 134 and restoring register-pilot relay 105. The registers would then be ready for registration of another set of digits. Register-pilot relay 105 is sleeved to make it a slow-release relay so that during transfer from one register to another, even though ground may be removed from conductors 134 for an instant, relay 105 will be maintained operated by reason of its slow-release characteristic. Register-pilot relay 105 is therefor maintained operated as long as a digit is stored in one of the registers preparatory to being sent.

As the sender successively sends the digits stored in each of the registers, the control of sending is progressively transferred from one register to the next succeeding register in the series until the last register in the series is reached. When the send-transfer relay 703 of the last register R12 is operated, following sending and clearing out of the digit stored therein, ground potential on conductor 717, instead of being transferred to an interconnected set of contacts of another register, is applied to the operate winding of the send-control relay 712. This relay has two windings similar to the register-control relay 711 previously described, one of which is an operate winding OP and the other a high-resistance hold-winding H. Application of ground potential to the operate winding OP over conductor 717 will cause relay 712 to operate, whereupon the path for hold-ground potential over conductor HG–133 to send-control conductor 715 through the back contacts 1 of relay 712, has the high-resistance winding of relay 712 interposed by closure of the front contacts 1 of the relay. The series connected relays 702 and 703 held operated in each of the registers respectively, are thereupon released, since the resistance in the hold winding of relay 712 is sufficiently high to reduce the current flowing to the connected relays 702 and 703 to a value below the release value of any of the relays. Upon release of each of the relays 702 and 703, the current maintaining the hold winding H of relay 712 energized stops flowing and ground potential extended through contacts 4 of send-transfer relay 703 to the operate winding of relay 712 is removed. Send-control conductor SC–132 is thereafter no longer extended beyond the first register, but is connected to the first register until any digit which may be stored therein is subsequently cleared out, whereupon it is successively transferred to the succeeding registers step-by-step until all stored digits in the sender are sent out.

While control of sending is being transferred from the last register R12 in the series to the first register R1, and the relays 702 and 703 in each of the registers drop out, hold ground on conductor HG–133 must continue to extend to each of the operated register relays A, B, C, and D in each of the registers in order to avoid losing any of the digits that may be stored therein. Such hold ground potential is assured by reason of each of the relays 703 being a slow-release relay since the short circuited winding on each prolongs the time of release beyond the time required for each of the relays 702 to release. Thus, the hold-ground potential on conductor HG–133 has a path provided to the register relays through the contacts 1 of relay 702 before contacts 1 of relay 703 open, and each of the operated register relays in the registers is held operated until complete transfer is effected. Sending of second digits from the registers thereafter proceeds in the same manner in which the first digits stored in the registers were sent.

When all digits in the sender have been sent, ground potential no longer is applied to any of the digit conductors 134. The pilot-relay 105 thereupon restores, causing its hold-ground contacts 2 to open. All operated relays in the registers, therefore, also restore. The send-start circuit is also opened at contacts 1 of register-pilot relay 105, thereby assuring that no further pulses will be generated by the pulser. Following release of the send-stop relay 106 at the end of the pause following the last pulse sent by the sender, all relays in the sender are de-energized, thus conditioning the sender for storage and sending of the next number.

I claim:

1. In a multi-digit register sender including digit registers operable responsive respectively to successive operations of a digit-keying means, each register including similar register relays, setting wires extending from the keying means to the respective relays of the first register and serving to operate such relays according to the first keying operation of a series, each register preceding the last including a register-transfer relay operable to transfer the setting wires from connection with its own register relays into connection with those of the next succeeding register, a normally energized control wire for operating the register-transfer relays subject to such wire being energized, contacts on each register relay of any register preceding the last operable therewith to close the operating circuit of the register-transfer relay of that register over said control wire, and control means responsive to each operation of the said keying means for temporarily deenergizing the control wire to prevent operation of the corresponding register-transfer relay until the instant keying operation is terminated.

2. In a register-sender as set forth in claim 1, said control means including a key-pilot relay and means for operating it over any of the said setting wires over a circuit path including a separate impedance device for each setting wire, said impedance devices serving to maintain said digit wires effectively isolated from each other.

3. In a register-sender as set forth in claim 2, each said impedance device comprising a rectifier.

4. In a register-sender as set forth in claim 2, each register relay including means for closing a local self-locking holding circuit upon being operated over a setting wire, any such circuit applying a potential locally to the corresponding setting wire until the associated register transfer relay has operated, and rectifiers included serially in the respective setting wires between the registers and the key-pilot relay to prevent the locally applied potentials from interfering with the operation of the key-pilot relay.

5. In a multi-digit register sender including digit registers responsive respectively to successive operations of a digit-keying means to store successive keyed digits, each register including similar register relays, setting wires extending from the keying means to the registers for operating the register relays thereof according to the respective keying operations of a series, transfer relays and means for controlling them to connect the setting wires to the register relays of the first register before the first keying operation of a series and to transfer the setting wires into connection with the remaining registers successively in timed sequence with the respective keying operations, digit sending apparatus and means for operating it under control of said digit registers successively to send the digits respectively stored therein, recycling means and means for operating it responsive to the said operation of the register relays in the last register for thereupon recycling the transfer relays and their said control means to permit said registers to respond anew to further respective keying operations, whereby digits in excess of the number of registers may be recorded by reusing some of the registers while the sending apparatus is sending the digits previously set up on some of said registers.

6. In a register sender as set forth in claim 5, means for starting the sending apparatus into operation after the registration of a digit in the first register and before the registration of a digit in the last register, means responsive to the completion by the sending apparatus of the sending of the digit stored by any digit register for clearing the register for the storage of a further digit, and means dependent jointly upon the operation of the said recycling means and upon the said clearing of any register for again connecting the setting wires to the register relays of such register dependent upon a second digit having been registered in any preceding register.

7. In a register sender as set forth in claim 5, said transfer relays including a separate transfer relay for each register preceding the last operable at the termination of the concerned keying operation to transfer the setting wires from the associated register to the next, a transfer-relay locking wire, each transfer relay including means for closing a self-locking holding circuit over the said locking wire, said means for recycling comprising means for deenergizing said locking wire until all the transfer relays have restored and for then reenergizing such wire.

8. In combination, a register sender and a sender-output wire, the register sender including a register, a sender, and a group of digit wires extending between them and each corresponding to a separate digit value, means for operating the register to register any said digit value and to place a marking potential on the corresponding digit wire, a register-pilot relay and means for operating it responsive to the said application of marking potential to any digit wire, means controlled by the register-pilot relay for indicating that a digit has been registered, means for operating said sender to transmit pulses successively over said output wire and for testing said digit wires successively for marking potential in timed sequence therewith, and means responsive to the said testing of the marked digit wire for terminating the said operation of the sending device.

9. In a combination as set forth in claim 8, the said means for operating the register-pilot relay including a separate normally closed connection thereto from each said digit wire and means for opening the said normally closed connections incidental to the said testing of the digit wires for marking potential.

10. In a combination as set forth in claim 9, the said opening means acting to open the normally closed connections successively in timed sequence with the transmission of pulses and the testing of the digit wires.

11. In a combination as set forth in claim 8, means controlled by the register-pilot relay for starting the said operation of the sender.

12. A register sender comprising a succession of digit registers, a sender, a group of digit wires extending in common between the registers and the sender, each digit wire corresponding to a separate digit value, means for operating any desired number of said registers in succession according to the number of digits in a desired number to store such number, each register being variably operated according to the value of the corresponding digit of the stored number to prepare a marking connection to the corresponding digit wire, means for closing the marking connection prepared by the first register, means controlled by the sender for causing it to operate repeatedly to send the registered digit values successively, each sending operation being controlled according to the digit wire to which a marking connection is currently made, means responsive to the sending operation corresponding to any digit register preceding the last for opening the currently closed marking connection and for closing the prepared marking connection of the next succeeding register, and means controlled over any digit wire responsive to the said opening of the final prepared marking connection for clearing out the register sender.

References Cited in the file of this patent

UNITED STATES PATENTS

| | | |
|---|---|---|
| 2,167,710 | Crocker | Aug. 1, 1939 |
| 2,511,145 | Balzer | June 13, 1950 |
| 2,554,115 | Molner | May 22, 1951 |